(12) United States Patent
Wang et al.

(10) Patent No.: US 11,727,276 B2
(45) Date of Patent: Aug. 15, 2023

(54) PROCESSING METHOD AND ACCELERATING DEVICE

(71) Applicant: Shanghai Cambricon Information Technology Co., Ltd., Pudong New Area (CN)

(72) Inventors: Zai Wang, Pudong New Area (CN);
Xuda Zhou, Pudong New Area (CN);
Zidong Du, Pudong New Area (CN);
Tianshi Chen, Pudong New Area (CN)

(73) Assignee: SHANGHAI CAMBRICON INFORMATION TECHNOLOGY CO., LTD, Shanghai (CN)

( * ) Notice: Subject to any disclaimer, the term of this patent is extended or adjusted under 35 U.S.C. 154(b) by 774 days.

(21) Appl. No.: 16/699,046

(22) Filed: Nov. 28, 2019

(65) Prior Publication Data

US 2020/0097831 A1     Mar. 26, 2020

Related U.S. Application Data

(63) Continuation of application No. 16/699,027, filed on Nov. 28, 2019, which is a continuation-in-part of (Continued)

(30) Foreign Application Priority Data

Aug. 9, 2017   (CN) .......................... 201710678038.8

(51) Int. Cl.
*G06N 3/082*     (2023.01)
*G06F 1/3296*    (2019.01)
(Continued)

(52) U.S. Cl.
CPC .......... *G06N 3/082* (2013.01); *G06F 1/3296* (2013.01); *G06F 9/3877* (2013.01);
(Continued)

(58) Field of Classification Search
CPC ........ G06N 3/082; G06N 3/04; G06N 3/0445; G06N 3/0481; G06N 3/063; G06N 3/084;
(Continued)

(56) References Cited

U.S. PATENT DOCUMENTS 4,422,141 A * 12/1983  Shoji ................... G06F 11/2236
                                                 714/E11.166
10,127,495 B1* 11/2018  Bopardikar ............ G06V 10/82
(Continued)

FOREIGN PATENT DOCUMENTS

CN         105512723 A     4/2016
CN         106485316 A     3/2017
(Continued)

OTHER PUBLICATIONS

He, Q., et al., "Effective Quantization Methods for Recurrent Neural Networks", arXiv:1611.10176v1 [cs.LG] Nov. 30, 2016.*
(Continued)

*Primary Examiner* — Xuemei G Chen
(74) *Attorney, Agent, or Firm* — Getech Law LLC; Jun Ye

(57) ABSTRACT

The present disclosure provides a processing device including: a coarse-grained pruning unit configured to perform coarse-grained pruning on a weight of a neural network to obtain a pruned weight, an operation unit configured to train the neural network according to the pruned weight. The coarse-grained pruning unit is specifically configured to select M weights from the weights of the neural network through a sliding window, and when the M weights meet a preset condition, all or part of the M weights may be set to 0. The processing device can reduce the memory access while reducing the amount of computation, thereby obtaining an acceleration ratio and reducing energy consumption.

16 Claims, 5 Drawing Sheets

Related U.S. Application Data application No. PCT/CN2018/088033, filed on May 23, 2018.

(51) Int. Cl.
| | | |
|---|---|---|
| *G06F 9/38* | (2018.01) | |
| *G06F 13/16* | (2006.01) | |
| *G06N 3/04* | (2023.01) | |
| *G06N 3/084* | (2023.01) | |
| *G06F 16/28* | (2019.01) | |
| *G06N 3/063* | (2023.01) | |
| *G06F 12/0875* | (2016.01) | |
| *G06N 3/044* | (2023.01) | |
| *G06N 3/048* | (2023.01) | |

(52) U.S. Cl.
CPC .......... *G06F 12/0875* (2013.01); *G06F 13/16* (2013.01); *G06F 16/285* (2019.01); *G06N 3/04* (2013.01); *G06N 3/044* (2023.01); *G06N 3/048* (2023.01); *G06N 3/063* (2013.01); *G06N 3/084* (2013.01); *G06F 2212/452* (2013.01); *G06F 2213/0026* (2013.01)

(58) Field of Classification Search
CPC ... G06N 3/0454; G06F 1/3296; G06F 9/3877; G06F 12/0875; G06F 13/16; G06F 16/285; G06F 2212/452; G06F 2213/0026; G06F 12/0848; G06F 2212/1008; G06F 2212/1032; G06F 2212/1041; G06F 2212/454; Y02D 10/00; G06K 9/6223

See application file for complete search history.

(56) References Cited

U.S. PATENT DOCUMENTS

| | | | |
|---|---|---|---|
| 2005/0102301 A1* | 5/2005 | Flanagan | ............ G06F 18/2321 |
| 2016/0358069 A1 | 12/2016 | Brothers | |
| 2018/0197081 A1* | 7/2018 | Ji | ......................... G06N 3/0454 |

FOREIGN PATENT DOCUMENTS

| | | | |
|---|---|---|---|
| CN | 106548234 | A | 3/2017 |
| CN | 106919942 | A | 7/2017 |
| CN | 106991477 | A | 7/2017 |

OTHER PUBLICATIONS

Choi, Y., et al., "Towards the Limit of Network Quantization," Published as a conference paper at ICLR 2017, Apr. 2017.*
Zeng Dan et al.: "Compressing Deep Neural Network for Facial Landmarks Detection", International Conference on Financial Cryptography and Data Security, Nov. 13, 2016, 11 Pages.
Song Han et al; "Deep Compression: Compressing Deep Neural Networks with Pruning, Trained Quantization and Huffman D2 Coding", Internet: URL:https://arxiv.org/pdf/1510.00149v5.pdf; Feb. 15, 2016; 14 pages.
Fujii Tomoya et al; "An FPGA Realization of a Deep Convolutional Neural Network Using a Threshold Neuron Pruning", International Conference on Financial Cryptography and Data Security; Mar. 31, 2017; 13 pages.
Sun Fangxuan et al.; "Intra-layer nonuniform quantization of convolutional neural network" 2016 8th International Conference on Wireless Communications & Signal Processing (WCSP), IEEE, Oct. 13, 2016, 5 pages.
Song Han et al.: "ESE: Efficient Speech Recognition Engine with Sparse LSTM on FPGA", Proceedings of the 2017 ACM/SIGDA International Symposium on Field-Programmable Gate Arrays; Feb. 17, 2017; 10 pages.
Sajid Anwar et al; "Structured Pruning of Deep Convolutional Neural Networks", ACM Journal on Emerging Technologies in Computing Systems; Feb. 9, 2017, 18 pages.
Yunchao Gong et al.; "Compressing Deep Convolutional Networks using Vector Quantization", Internet: URL:https://arxiv.org/pdf/1412.6115.pdf ; Dec. 18, 2014, 10 pages.
Kadetotad Deepak et al.; "Efficient memory compression in deep neural networks using coarse-grain sparsification for speech applications", 2016 IEEE/ACM International Conference on Computer-Aided Design, Nov. 7, 2016, 8 pages.
Song Han et al.; "Leraning both weights and connections for efficient neural networks" Published as a conference paper at NIPS 2015; Internet URL: https://arxiv.org/abs/1506.02626; Oct. 30, 2015; 9 pages.
EP 18806558.5, European Search Report dated Apr. 24, 2020, 13 pages.
EP 19214007.7, European Search Report dated Apr. 15, 2020, 12 pages.
EP 19214010.1, European Search Report dated Apr. 21, 2020, 12 pages.
EP 19214015.0, European Search Report dated Apr. 21, 2020, 14 pages.
Moons, Bert, et. al. "Energy-Efficient ConvNets Through Approximate Computing", arXiv:1603.06777v1, Mar. 22, 2016, 8 pages.
EP 19 214 010.1, Communication pursuant to Article 94(3), dated Jan. 3, 2022, 11 pages.
Huang, Hongmei, et al, "Fault Prediction Method Based on RBF Network On-Line Learning", Journal of Nanjing University of Aeronautics & Astronautics, vol. 39 No. 2, Apr. 2007, 4 pages.
CN 201710370905.1—Second Office Action, dated Mar. 18, 2021,11 pages. (with English translation).
CN 201710583336.9—First Office Action, dated Apr. 23, 2020, 15 pages. (with English translation).
CN 201710677987.4—Third Office Action, dated Mar. 30, 2021, 16 pages. (with English translation).
CN 201710678038.8—First Office Action, dated Oct. 10, 2020, 12 pages. (with English translation).
CN 201710689666.6—First Office Action, dated Jun. 23, 2020, 19 pages. (with English translation).
CN 201710689666.6—Second Office Action, dated Feb. 3, 2021, 18 pages. (with English translation).
CN 201710689595.X—First Office Action, dated Sep. 27, 2020, 21 pages. (with English translation).
Liu, Shaoli, et al., "Cambricon: An Instruction Set Architecture for Neural Networks", ACM/IEEE, 2016, 13 pages.
CN 201710689595.X—Second Office Action, dated Jun. 6, 2021, 17 pages. (with English translation).
EP 18 806 558.5, Communication pursuant to Article 94(3), dated Dec. 9, 2021, 11 pages.
EP 19 214 007.7, Communication pursuant to Article 94(3), dated Dec. 8, 2021, 10 pages.
EP 19 214 015.0, Communication pursuant to Article 94(3), dated Jan. 3, 2022, 12 pages.
PCT/CN2018/088033—Search Report, dated Aug. 21, 2018, 19 pages. (with English translation).

* cited by examiner

PROCESSING METHOD AND ACCELERATING DEVICE

TECHNICAL FIELD

The disclosure relates to a processing method and an accelerating device in the field of computer, particularly to a processing method and an accelerating device for accelerating operation through a weight of pruning neural network.

BACKGROUND

Neural networks have been successfully applied. However, as neural networks that are deeper and larger in scale have been designed, more weights would be introduced, and therefore super large-scale weight may become a huge challenge to neural network application. On the one hand, large-scale weight data imposes higher requirement on storage capacity, and large amount of storage operation will cost high memory access energy consumption. On the other hand, a large number of weights also impose higher requirement on operation units, thus the computing time and energy consumption increase accordingly. Therefore, it becomes an urgent problem to reduce the weights of neural networks on the premise of reducing the computation precision so that the data storage and computational amount could also be reduced.

Most of the current work mainly adopts low-rank matrix decomposition, hash techniques, or the like, however, weights and the amount of computation that may be reduced by using those methods are limited, and the precision of the neural network may also be reduced.

Therefore, a more effective method is needed to reduce the weights of neural networks and the amount of computation.

SUMMARY

(1) Technical Problems to be Solved

The disclosure is intended to provide a data quantization device and a data quantization method, a processing device and a processing method to solve at least one of the above-described technical problems.

(2) Technical Solutions

The present disclosure provides a data quantization method including the following steps:
grouping the weights of a neural network;
performing a clustering operation on each group of weights by using a clustering algorithm, dividing a group of weights into m classes, computing a center weight for each class, and replacing all the weights in each class by the center weights, where m is a positive integer; and
encoding the center weight to get a weight codebook and a weight dictionary.

Furthermore, the method may also include:
retraining the neural network, where only the weight codebook is trained, and the weight dictionary remains unchanged.

Furthermore, the retraining may adopt a back-propagation algorithm.

Furthermore, the grouping may include grouping into a group, layer-type-based grouping, inter-layer-based grouping, and/or intra-layer-based grouping.

Furthermore, the clustering algorithm may include K-means, K-medoids, Clara and/or Clarans.

Furthermore, the grouping is grouping into one group, which may include:
all weights of the neural network are grouped into one group.

Furthermore, the neural network may include a total of t different types of layers such as i convolutional layers, j fully connected layers, and m LSTM layers, where i, j, m are integers greater than or equal to 0, and satisfy i+j+m≥1, t is an integer greater than or equal to 1 and satisfies t=i+j+m, and the grouping being a layer-type-based grouping may include:
grouping the weights of neural network into t groups.

Furthermore, the grouping being inter-layer-based grouping may include:
grouping the weights of one or a plurality of convolutional layers, one or a plurality of fully connected layers and one or a plurality of LSTM layers in the neural network into one group respectively.

Furthermore, the grouping being intra-layer-based grouping may include:
determining the convolutional layer of the neural network as a four-dimensional matrix (Nfin, Nfout, Kx, Ky), where Nfin, Nfout, Kx, Ky are positive integers, Nfin represents a count of input feature maps, and Nfout represents a count of output feature maps, (Kx, Ky) represents the size of the convolution kernel; grouping the weights of the convolutional layer into Nfin*Nfout*Kx*Ky/(Bfin*Bfout*Bx*By) different groups according to the group size of (Bfin, Bfout, Bx, By), where Bfin is a positive integer less than or equal to Nfin, Bfout is a positive integer less than or equal to Nfout, Bx is a positive integer less than or equal to Kx, and By is a positive integer less than or equal to Ky; or
determining the fully connected layer of the neural network as a two-dimensional matrix (Nin, Nout), where Nin, Nout are positive integers, Nin represents a count of input neurons, Nout represents a count of output neurons, and a count of weight is Nin*Nout; the weights of fully connected layer are divided into (Nin*Nout)/(Bin*Bout) different groups according to the group size of (Bin, Bout), where Bin is a positive integer less than or equal to Nin, and Bout is a positive integer less than or equal to Nout; or
determining the weights of the LSTM layer of the neural network as a combination of the weights of a plurality of fully connected layers, where the weights of the LSTM layer are composed of the weights of n fully connected layers, n is a positive integer, therefore each fully connected layer can be grouped according to the grouping mode of the fully connected layer.

Furthermore, the grouping method may be grouping into one group, inter-layer-based grouping, and intra-layer-based grouping, and the grouping method may specifically include:
grouping the convolutional layer into one group, grouping the fully connected layers by the intra-layer-based grouping method, and grouping the LSTM layers by the inter-layer-based grouping method.

Further, a center weight selection method of a class is: minimizing the cost function $J(w, W_0)$ Furthermore, the cost function is:

$$J(w, w_0) = \sum_{i=1}^{n} (w_i - w_0)^2$$

where w is the weight of a class, w0 is the center weight of the class, n is a count of weights in the class, n is a positive integer, w1 is the $i^{th}$ weight of the class, i is a positive integer, and $1 \le i \le n$.

An embodiment of the present disclosure provides a data quantization device including:

a memory configured to store an operation instruction; and a processor configured to perform the operation instruction stored in the memory in accordance with all or part of the quantization method described above.

Further, the operation instruction is a binary number including an operation code and an address code, where the operation code indicates an operation to be performed by the processor, and the address code indicates an address in the memory where the processor reads data participating in the operation.

An embodiment of the present disclosure provides a processing device, which may include:

a control unit configured to receive an instruction and decode the instruction to generate search and control information and operation control information;

a lookup table unit configured to receive the search and control information, a weight dictionary and a weight codebook, and perform a table lookup operation on the weight dictionary and the weight codebook to obtain a quantized weight according to the search and control information; and an operation unit configured to receive the operation control information and input neuron, and perform an operation on the quantized weight and input neuron according to the operation control information to obtain an output neuron and output the output neuron.

Furthermore, the processing device may also include:

a pre-processing unit configured to pre-process external input information to obtain the input neuron, weight dictionary, weight codebook, and instruction;

a storage unit configured to store the input neuron, weight dictionary, weight codebook and instruction, and receive the output neuron;

a caching unit configured to cache the instruction, input neuron, output neuron, weight dictionary, and weight codebook; and a DMA unit configured to read/write data or instruction between the storage unit and the caching unit.

Furthermore, the pre-processing unit pre-processing external input information may include: segmentation, Gaussian filter, binarization, regularization and/or normalization.

Further, the caching unit may include:

an instruction caching unit configured to cache the instruction;

an input neuron caching unit configured to cache the input neuron; and an output neuron caching unit configured to cache the output neuron.

Further, the caching unit may further include:

a weight dictionary caching unit configured to cache the weight dictionary; and a weight codebook caching unit configured to cache the code book.

Further, the instruction is a neural network dedicated instruction including:

a control instruction configured to control an execution process of the neural network;

a data transfer instruction configured to perform data transfer between different storage media, where a data format may include a matrix format, a vector format, and a scalar format;

an operation instruction configured to perform an arithmetic operation on the neural network including a matrix operation instruction, a vector operation instruction, a scalar operation instruction, a convolutional neural network operation instruction, a fully connected neural network operation instruction, a pooling neural network operation instruction, a Restricted Boltzmann Machine (RBM) neural network operation instruction, a Local Response Normalization (LRN) neural network operation instruction, a Local Contrast Normalization (LCN) neural network operation instruction, a Long Short-Term Memory (LSTM) neural network operation instruction, a Recurrent Neural Networks (RNN) operation instruction, a Rectified Linear Unit (RELU) neural network operation instruction, a Parametric Rectified Linear Unit (PRELU) neural network operation instruction, a SIGMOID neural network operation instruction, a TANH neural network operation instruction and a MAXOUT neural network operation instruction; and a logical instruction configured to perform the neural network logical operation including a vector logical operation instruction and a scalar logical operation instruction.

Furthermore, the neural network dedicated instruction may include at least a Cambricon instruction composed of an operation code and an operand, and the Cambricon instruction may include:

a Cambricon control instruction, including a jump instruction and a conditional branch instruction, configured to control the execution process;

a Cambricon data transfer instruction, including a loading instruction, a storage instruction, and a moving instruction, configured to transfer data between different storage media; where the loading instruction may be configured to load data from a main memory to a cache; the storage instruction may be configured to store data from the cache to the main memory; and the moving instruction may be configured to move data from the cache to another cache or from the cache to a register or from the register to another register;

a Cambricon operation instruction, including a Cambricon matrix operation instruction, a Cambricon vector operation instruction, and a Cambricon scalar operation instruction, configured to perform a neural network arithmetic operation; where the Cambricon matrix operation instruction may be configured to complete a matrix operation in the neural network, and the Cambricon matrix operation may include a matrix-vector multiplication operation, a vector multiply matrix operation, a matrix multiply scalar operation, an outer product operation, a matrix-add-matrix operation, and a matrix-subtract-matrix operation; the Cambricon vector operation instruction may be configured to complete a vector operation in the neural network, and the Cambricon vector operation may include a vector elementary operation, a vector transcendental function operation, a dot product operation, a random vector generation operation, and an operation of maximum/minimum of a vector; and the Cambricon scalar operation instruction may be configured to complete a scalar operation in the neural network, and the Cambricon scalar operation may include a scalar elementary operation and a scalar transcendental function; and a Cambricon logical instruction, including a Cambricon vector logical operation instruction and a Cambricon scalar logical operation instruction, configured for the logical operation of the neural network; where the Cambricon vector logical operation instruction may be configured for a vector comparing operation and a vector logical operation, the vector logical operation may include AND, OR, and NOT, and the Cambricon scalar logical operation instruction may be configured for a scalar comparing operation and a scalar logical operation.

In an embodiment, the Cambricon data transfer instruction may support one or more of the following data organization manners: matrix, vector, and scalar;

the vector elementary operation may include vector addition, subtraction, multiplication, and division;

the vector transcendental function may refer to a function which does not meet any polynomial equation taking polynomials as coefficients, and the function may include an exponential function, a logarithmic function, a trigonometric function, and an anti-trigonometric function;

the scalar elementary operation may include scalar addition, subtraction, multiplication, and division; the scalar transcendental function may refer to a function which does not meet any polynomial equation taking polynomials as coefficients, and the scalar transcendental function may include an exponential function, a logarithmic function, a trigonometric function, and an anti-trigonometric function;

the vector comparing operation may include greater than, smaller than, equal to, greater than or equal to ($\geq$), less than or equal to ($\leq$), and unequal to;

the vector logical operation may include AND, OR, and NOT;

the scalar comparing operation may include but may be not limited to greater than, smaller than, equal to, greater than or equal to ($\geq$), less than or equal to ($\leq$), and unequal to; and the scalar logical operation may include AND, OR, and NOT.

Furthermore, the storage unit may be configured to store an unquantized weight, which is directly output to the operation unit.

The operation unit may include:

a first operation part configured to multiply the weight and the input neuron; and/or a second operation part including one or a plurality of adders configured to add the weight and input neuron by one or a plurality of adders; and/or a third operation part configured to perform a nonlinear function on the weight and input neuron, where the nonlinear function may include an active function, and the active function may include sigmoid, tanh, relu and/or softmax; and/or a fourth operation part configured to perform a pooling operation on the weight and input neuron, where the pooling operation may include average pooling, maximum pooling, and/or median pooling, and the weight may include the unquantized weight and/or quantized weight.

Furthermore, the second operation part may include a plurality of adders, and the plurality of adders may constitute an adder tree to realize the addition of the weight and input neuron step by step.

An embodiment of the present disclosure provides a processing method including the following steps:

receiving the input neuron, the weight dictionary, the weight codebook and the instruction;

decoding the instruction to generate the search and control information and operation control information; and looking up the weight dictionary and the weight codebook to obtain the quantized weight according to the search and control information, and performing operation on the quantized weight and input neuron according to the operation control information to obtain an output neuron and output the output neuron.

In an embodiment, before receiving the input neuron, weight dictionary, weight codebook and instruction, the method may further include the following step:

pre-processing the external input information to obtain the input neuron, weight dictionary, weight codebook, and instruction.

After receiving the input neuron, weight dictionary, weight codebook and instruction, the method may further include the following step:

storing the input neuron, weight dictionary, weight codebook, instruction and output neuron, and caching the instruction, input neuron and output neuron.

Further, after receiving the input neuron, weight dictionary, weight codebook and instruction, the method may further include: caching the weight dictionary and weight codebook.

In an embodiment, the pre-processing may include segmentation, Gaussian filter, binarization, regularization and/or normalization.

Further, the instruction is a neural network dedicated instruction, which may include:

a control instruction configured to control the execution process of the neural network;

a data transfer instruction configured to perform data transfer between different storage media, where a data format may include a matrix format, a vector format, and a scalar format;

an operation instruction configured to perform an arithmetic operation on the neural network including a matrix operation instruction, a vector operation instruction, a scalar operation instruction, a convolutional neural network operation instruction, a fully connected neural network operation instruction, a pooling neural network operation instruction, a Restricted Boltzmann Machine (RBM) neural network operation instruction, a Local Response Normalization (LRN) neural network operation instruction, a Local Contrast Normalization (LCN) neural network operation instruction, a Long Short-Term Memory (LSTM) neural network operation instruction, a Recurrent Neural Networks (RNN) operation instruction, a Rectified Linear Unit (RELU) neural network operation instruction, a Parametric Rectified Linear Unit (PRELU) neural network operation instruction, a SIGMOID neural network operation instruction, a TANH neural network operation instruction and a MAXOUT neural network operation instruction; and a logical instruction configured to perform the neural network logical operation including a vector logical operation instruction and a scalar logical operation instruction.

Furthermore, the neural network dedicated instruction may include at least a Cambricon instruction composed of an operation code and an operand, and the Cambricon instruction may include:

a Cambricon control instruction, including a jump instruction and a conditional branch instruction, configured to control the execution process;

a Cambricon data transfer instruction, including a loading instruction, a storage instruction, and a moving instruction, configured to transfer data between different storage media; where the loading instruction may be configured to load data from a main memory to a cache; the storage instruction may be configured to store data from the cache to the main memory; and the moving instruction may be configured to move data from the cache to another cache or from the cache to a register or from the register to another register;

a Cambricon operation instruction, including a Cambricon matrix operation instruction, a Cambricon vector operation instruction, and a Cambricon scalar operation instruction, configured to perform a neural network arithmetic operation; where the Cambricon matrix operation instruction may be configured to complete a matrix operation in the neural network, and the Cambricon matrix operation may include a matrix-vector multiplication operation, a vector multiply matrix operation, a matrix multiply scalar operation, an outer product operation, a matrix-add-matrix operation, and a matrix-subtract-matrix operation; the Cambricon vector operation instruction may be configured to complete a vector operation in the neural network, and the Cambricon vector operation may include a vector elementary operation, a vector transcendental function operation, a dot product operation, a random vector generation operation, and an operation of maximum/minimum of a vector; and the Cambricon scalar operation instruction may be configured to complete a scalar operation in the neural network, and the Cambricon scalar operation may include a scalar elementary operation and a scalar transcendental function; and a Cambricon logical instruction, including a Cambricon vector logical operation instruction and a Cambricon scalar logical operation instruction, configured for the logical operation of the neural network; where the Cambricon vector logical operation instruction may be configured for a vector comparing operation and a vector logical operation, the vector logical operation may include AND, OR, and NOT, and the Cambricon scalar logical operation instruction may include a scalar comparing operation instruction and a scalar logical operation instruction.

In an embodiment, the Cambricon data transfer instruction may support one or more of the following data organization manners: matrix, vector, and scalar;

the vector elementary operation may include vector addition, subtraction, multiplication, and division;

the vector transcendental function may refer to a function which does not meet any polynomial equation taking polynomials as coefficients, and the function may include an exponential function, a logarithmic function, a trigonometric function, and an anti-trigonometric function;

the scalar elementary operation may include scalar addition, subtraction, multiplication, and division; the scalar transcendental function may refer to a function which does not meet any polynomial equation taking polynomials as coefficients, and the scalar transcendental function may include an exponential function, a logarithmic function, a trigonometric function, and an anti-trigonometric function;

the vector comparing operation may include greater than, smaller than, equal to, greater than or equal to ($\geq$), less than or equal to ($\leq$), and unequal to;

the vector logical operation may include AND, OR, and NOT;

the scalar comparing operation may include greater than, smaller than, equal to, greater than or equal to ($\geq$), less than or equal to ($\leq$), and unequal to; and the scalar logical operation may include AND, OR, and NOT.

Furthermore, the method may further include the following steps: receiving an unquantized weight, and performing operation on the unquantized weight and input neuron to obtain an output neuron and output the output neuron.

Further, the operation may include:
adding the weight and input neuron; and/or
multiplying the weight and input neuron; and/or
performing a nonlinear function on the weight and input neuron, where the nonlinear function may include an active function, and the active function may include sigmoid, tanh, relu and/or softmax; and/or
performing a pooling operation on the weight and input neuron, where the pooling operation may include average pooling, maximum pooling, and/or median pooling, and the weight may include the unquantized weight and/or quantized weight.

In an embodiment, one or a plurality of adders are configured to add the weight and input neuron.

Further, a plurality of adders may constitute an adder tree to realize the addition of the weight and input neuron step by step.

(3) Technical Effects

The data quantization device and the data quantization method, the processing device and the processing method provided by the present disclosure have at least one of the following technical effects:

1. The data quantization method of the present disclosure does not have the problem that quantization may be only performed with a layer of a neural network as a unit. By using the similarity of the inter-layer-based weights and the local similarity of the intra-layer-based weights of the neural network, the method may exploit the weight distribution characteristics of the neural network to perform low bit quantization, and reduce a count of bits of each weight, which may thereby reduce the weight storage overhead and the memory access overhead.

2. The data quantization method of the present disclosure retrains the neural network, where only the weight codebook needs to be retrained and the weight dictionary does not need to be retrained, which may simplify the retraining.

3. The processing device of the present disclosure performs a plurality of operations on the quantized and unquantized weights simultaneously, which can realize the diversification of operations.

4. The present disclosure adopts a dedicated instruction and a flexible operation unit for a multi-layer artificial neural network operation aiming at local quantization, to solve the problem that the CPU and GPU have inadequate operational performance and the front-end decoding overhead is high, therefore the support for the multi-layer artificial neural network operation algorithm may be effectively improved.

5. The present disclosure adopts a dedicated on-chip cache for the multi-layer artificial neural network operation algorithm, fully exploits the reuse of input neurons and weight data, which may avoid repeatedly reading these data into memory, reducing memory access bandwidth. Therefore, the memory bandwidth may no longer be a bottleneck of the performance of multi-layer artificial neural network operations and training algorithms.

DETAILED DESCRIPTION OF THE EMBODIMENTS

Figure 1:
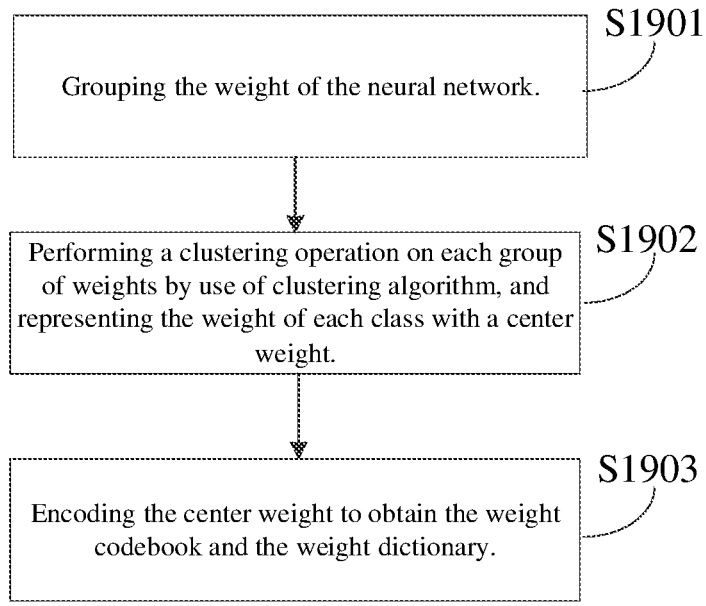
FIG. 1 is a flowchart of a data quantization method according to an embodiment of the disclosure.

In order to make the purpose, technical solutions, and advantages of the disclosure clearer, the disclosure will further be described below in combination with specific embodiments and with reference to the accompanied drawings in detail.

All of the modules in the embodiment of the disclosure may be hardware structures. Physical implementation of the hardware structures may include but not be limited to a physical device, and the physical device may include but not be limited to transistors, memristors, and Deoxyribonucleic Acid (DNA) computers.

It should be noted that "first", "second", "third", etc., used in the present disclosure are only used to distinguish different objects, and do not imply that there is any particular sequential relationship between these objects.

In the prior art, quantization is performed only with a layer of a neural network as a unit. In order to improve the prior art, the present disclosure provides a data quantization method, which includes: grouping weights of the neural network by adopting a grouping method and a clustering operation, dividing the weights of each group into m classes and computing a center weight of each class, where all the weights in each group are replaced by the center weight of the corresponding group, and encoding the center weights to obtain a weight codebook and a weight dictionary.

In the present disclosure, the neural network may be retrained, where only the weight codebook need to be retrained, the weight dictionary remains unchanged, which reduces the workload. The quantized weight obtained by the data quantization method may be applied to the processing device provided by the present disclosure, and a lookup table unit is added, therefore, the quantized weight may be obtained just by looking up the weight dictionary and the weight codebook according to a search and control instruction, while it is not necessary to input the weight, which makes the operation more systematized. By fully exploiting a distribution characteristic of the weight of the neural network, a low bit quantized weight is obtained, which greatly improves the processing speed and reduces the weight storage overhead and the memory access overhead.

Some embodiments of the present disclosure will be described more comprehensively with reference to the description of the accompanied drawings later, where some but not all embodiments will be shown. In fact, the embodiments of this disclosure may be implemented in many different forms, the described embodiments are merely some rather than all embodiments of the present disclosure. The provision of these embodiments enables the disclosure to meet applicable legal requirements.

In the present specification, the following embodiments for describing the principle of the present disclosure are merely illustrative and should not be construed in any way as limiting the scope of the disclosure. The following description with reference to the accompanied drawings is provided to assist in a comprehensive understanding of the exemplary embodiments of the present disclosure as defined by the claims and the equivalents of the claims. The following description includes various specific details to facilitate the understanding, but these details should be regarded as merely exemplary. Therefore, those of ordinary skill in the art should realize that various changes and modifications of the embodiments described herein can be made without departing from the scope and spirit of the present disclosure. In addition, descriptions of well-known functions and structures are omitted for clarity and conciseness. Moreover, same reference numerals are used for similar functions and operations throughout the drawings. In the present disclosure, the terms "include" and "contain" and derivatives thereof are intended to be inclusive but not limiting.

In order to make the object, technical solution and advantages of the present disclosure more apparent, the present disclosure will be further described in detail below with reference to the drawings in conjunction with specific embodiments thereof.

An embodiment of the present disclosure provides a data quantization method. FIG. 1 is a flowchart of a data quantization method according to an embodiment of the disclosure. As shown in FIG. 1, the method may include the following steps.

In S1901 step, grouping a weight of a neural network, where the grouping methods may include grouping into a group, layer-type-based grouping, inter-layer-based grouping, intra-layer-based grouping, mixed grouping, and the like.

In S1902 step, performing the clustering operation on each group of weights by using a clustering algorithm, and representing the weight of each class with a center weight, specifically, grouping the weights of each group into m classes, computing the center weight of each class, and replacing all the weights of each class by the center weight corresponding to the class.

The clustering algorithm may include but not be limited to K-means, K-medoids, Clara, and Clarans.

Further, a center weight selection method of a class is: minimizing the cost function $J(w, w_0)$.

Furthermore, the cost function is:

$$J(w, w_0) = \sum_{i=1}^{n} (w_i - w_0)^2$$

where w is the weight of a class, w0 is the center weight of the class, n is a count of weights in the class, n is a positive integer, w1 is the $i^{th}$ weight of the class, i is a positive integer, and $1 \leq i \leq n$.

In step S1903, encoding the center weight to obtain the weight codebook and the weight dictionary.

The data quantization may further achieve retraining on the neural network, where only the weight codebook needs to be retrained, the weight dictionary remains unchanged. Specifically, a back-propagation algorithm may be adopted to retrain the neural network.

Figure 2:
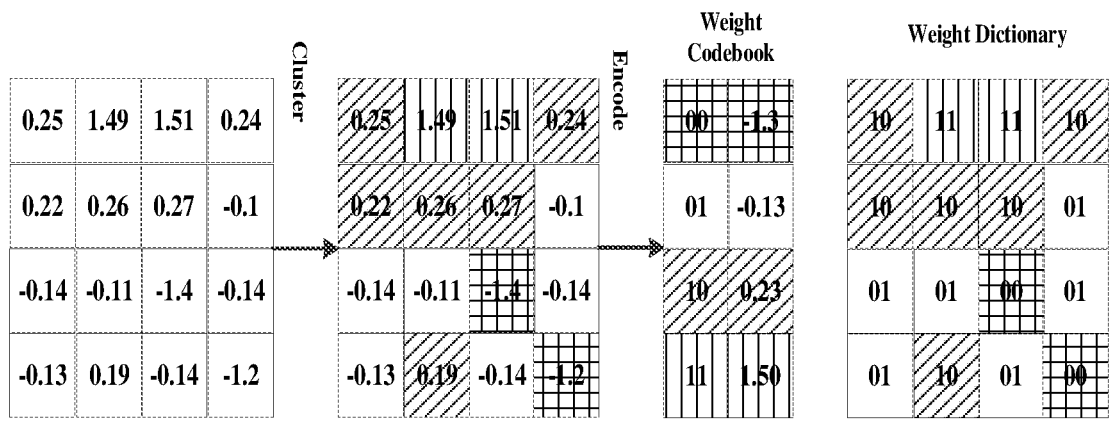
FIG. 2 is a flowchart of quantizing data according to an embodiment of the disclosure.

FIG. 2 is a flowchart of quantizing data according to an embodiment of the disclosure. As shown in FIG. 2, the weights of the neural network are grouped to obtain an ordered matrix of weights. Then, the intra-group sampling and the clustering operation are performed on the grouped weight matrix, so that the weights with similar values are classified into the same class, and the four center weights of 1.50, −0.13, −1.3, and 0.23 are obtained, where the four center weights are corresponding to the weights of four classes. Next, the center weight is encoded, where the class with a center weight of −1.3 is encoded as 00, the class with a center weight of −0.13 is encoded as 01, the class with a center weight of 0.23 is encoded as 10, and the class with a weight of 1.50 is encoded as 11, and 00, 01, 10, 11 are the content of the weight codebook. In addition, the encoding contents (00, 01, 10 and 11) corresponding to the four center weight respectively represent the weights in the corresponding classes, so as to obtain the weight dictionary.

The quantization process fully exploits the similarity of the inter-layer-based weights and the local similarity of the intra-layer-based weights of the neural network, and obtains the weight distribution characteristics of the neural network to perform low-bit quantization, which may reduce a count of bits representing each weight, and reducing the weight storage overhead and the memory access overhead.

Next, embodiments are given to illustrate the data quantization method of the neural network.

Embodiment 1: all the weights of the neural network may be grouped into one group, K-means clustering algorithm may be adopted to cluster each group of weights, a center weight of each class may be computed, and all the weights of each class may be replaced by the center weights. Then, the weight dictionary and the weight codebook are generated according to the quantized weights, and the neural network is retrained. In the retraining process, only the weight codebook is trained, while the weight dictionary remains unchanged. Specifically, the back propagation algorithm may be adopted for retraining.

Embodiment 2: the weights of the neural network are grouped according to layer-type-based. For example, the neural network may include a fully connected layer, a convolutional layer, and/or a LSTM layer. The weights in the convolutional layers are grouped into one group, the weights in the fully connected layers are grouped into one group, and the weights in the LSTM layers are grouped into one group.

If a neural network has a total of t different types of layers such as i convolutional layers, j fully connected layers, and m LSTM layers, where i, j, m are integers greater than or equal to 0 and satisfy i+j+m>=1, t is an integer greater than or equal to 1 and satisfies t=i+j+m, and the weight of the neural network will be divided into t groups. The K-medoids clustering algorithm may be adopted to cluster each group of weights of the t groups, and the center weight of each class may be computed, all the weights of each class may be replaced by the center weight corresponding to the class. Then, the weight dictionary and the weight codebook are generated according to the quantized weights, and the neural network is retrained. In the retraining process, only the weight codebook is trained, while the weight dictionary remains unchanged. Specifically, the back propagation algorithm may be adopted for retraining.

Embodiment 3: the weights of the neural network are grouped according to inter-layer-based structure.

Specifically, the one or more successive convolutional layers are grouped into one group, the one or more successive fully connected layers are grouped into one group, and the one or more successive LSTM layers are grouped into one group. The Clara clustering algorithm may be adopted to cluster each group of weights, where the weights with similar values may be grouped into the same class, and the center weight of each class may be computed, all the weights of each class may be replaced by the center weight corresponding to the class. Then, the weight dictionary and the weight codebook are generated according to the quantized weights, and the neural network is retrained. In the retraining process, only the weight codebook is trained, while the weight dictionary remains unchanged. Specifically, the back propagation algorithm may be adopted for retraining.

Embodiment 4: the weights of the neural network are grouped according to intra-layer-based structure.

Specifically, the convolutional layers of the neural network may be regarded as a four-dimensional matrix (Nfin, Nfout, Kx, Ky), where Nfin, Nfout, Kx, Ky are positive integers, Nfin represents a count of input feature maps, and Nfout represents a count of output feature maps, (Kx, Ky) represents the size of the convolution kernel. The weights of the convolutional layers are grouped into Nfin*Nfout*Kx*Ky/(Bfin*Bfout*Bx*By) different groups according to the group size of (Bfin, Bfout, Bx, By), where Bfin is an integer less than or equal to Nfin, Bfout is an integer less than or equal to Nfout, Bx is an integer less than or equal to Kx, and By is an integer less than or equal to Ky.

The weights in the fully connected layers of the neural network are regarded as a two-dimensional matrix (Nin, Nout), where Nin, Nout are positive integers, Nin represents a count of input neurons, Nout represents a count of output neurons, and a count of weight is Nin*Nout. The weights of fully connected layer are grouped into (Nin*Nout)/(Bin*Bout) different groups according to the group size of (Bin, Bout), where Bin is an integer less than or equal to Nin, and Bout is an integer less than or equal to Nout.

The weights in the LSTM layers of the neural network are regarded as a combination of the weights of a plurality of fully connected layers, where the weights of the LSTM layer are composed of the weights of n fully connected layers, n is a positive integer, therefore each fully connected layer can be grouped according to the grouping mode of the fully connected layer.

The Clarans clustering algorithm may be adopted to cluster each group of weights, and the center weight of each class may be computed, all the weights of each class may be replaced by the center weight corresponding to the class. Then, the weight dictionary and the weight codebook are generated according to the quantized weights, and the neural network is retrained. In the retraining process, only the weight codebook is trained, while the weight dictionary remains unchanged. Specifically, the back propagation algorithm may be adopted for retraining.

Embodiment 5: the weights of the neural network are grouped in a mixed manner. For example, all the convolutional layers are grouped into one group, all the fully connected layers are grouped according to inter-layer-based structure, and all the LSTM layers are grouped according to intra-layer-based structure. The Clarans clustering algorithm may be adopted to cluster each group of weights, and the center weight of each class may be computed, all the weights of each class may be replaced by the center weight corresponding to the class. Then, the weight dictionary and the weight codebook are generated according to the quantized weights, and the neural network is retrained. In the retraining process, only the weight codebook is trained, while the weight dictionary remains unchanged. Specifically, the back propagation algorithm may be adopted for retraining.

Figure 3:
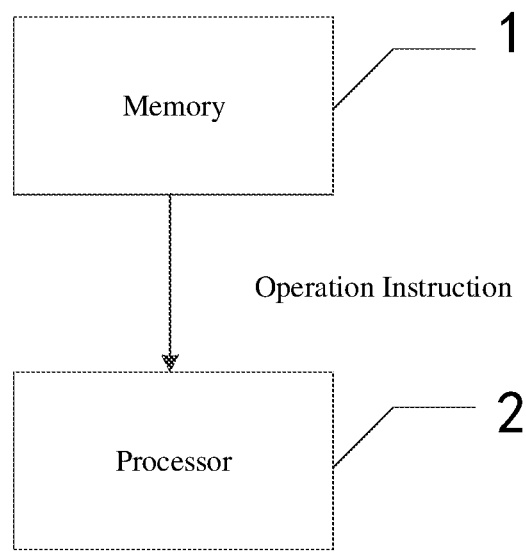
FIG. 3 is a schematic structure diagram of a data quantization device according to an embodiment of the disclosure.

Another embodiment of the present disclosure provides a data quantization device. FIG. 3 is a schematic structure diagram of a data quantization device according to an embodiment of the disclosure. As shown in FIG. 3, the data quantization device may include:

a memory 1 configured to store an operation instruction, where the operation instruction is a binary number composed of an operation code and an address code, the operation code indicates an operation to be performed by a processor 2, and the address code indicates the address of the memory 1 where the processor 2 reads data participating in the operation;

a processor 2 configured to execute an operation instruction in the memory 1 in accordance with the data quantization method.

By executing the operation instruction in the memory 1 in accordance with the data quantization method, the processor 2 may quantize the disordered weights to obtain low bit and normalized quantized weight. The data quantization device of the present disclosure may fully exploit the similarity of the inter-layer-based weights and the local similarity of the intra-layer-based weights of the neural network, and obtain the weight distribution characteristics of the neural network to perform low-bit quantization, which may reduce a count of bits representing each weight, and reducing the weight storage overhead and the memory access overhead.

Figure 4:
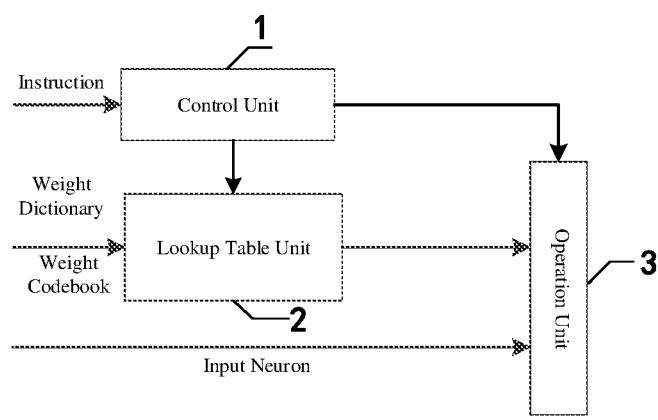
FIG. 4 is a schematic structure diagram of a processing device according to an embodiment of the disclosure.

Another embodiment of the present disclosure provides a processing device. FIG. 4 is a schematic structure diagram of a processing device according to an embodiment of the disclosure. As shown in FIG. 4, the processing device may include a control unit 1, a lookup table unit 2, and an operation device 3.

The control unit 1 may be configured to receive an instruction and decode the instruction to generate search and control information and operation control information, where the instruction may be a neural network dedicated instruction including all instructions dedicated to completing artificial neural network operations. The dedicated instruction may include but not be limited to a control instruction, a data transfer instruction, an operation instruction, and a logical instruction, where the control instruction may be configured to control the neural network execution process.

The data transfer instruction may be configured to transfer data between different storage media, and the data format may include but not be limited to matrix, vector, and scalar.

The operation instruction may be configured to perform a neural network arithmetic operation, and the operation instruction may include but not be limited to a matrix operation instruction, a vector operation instruction, a scalar operation instruction, a convolutional neural network operation instruction, a fully connected neural network operation instruction, a pooling neural network operation instruction, an RBM neural network operation instruction, an LRN neural network operation instruction, an LCN neural network operation instruction, an LSTM neural network operation instruction, an RNN operation instruction, an ReLU neural network operation instruction, a PReLU neural network operation instruction, a SIGMOID neural network operation instruction, a TANH neural network operation instruction, and a MAXOUT neural network operation instruction.

The logical instruction may be configured to perform a logical operation of the neural network, and the logical instruction may include but not be limited to a vector logical operation instruction and a scalar logical operation instruction.

Where, the RBM neural network operation instruction may be configured to implement an RBM neural network operation.

The LRN neural network operation instruction may be configured to implement an LRN neural network operation.

The LCN neural network operation instruction may be configured to implement an LCN neural network operation.

The LSTM neural network operation instruction may be configured to implement an LSTM neural network operation.

The RNN neural network operation instruction may be configured to implement an RNN neural network operation.

The RELU neural network operation instruction may be configured to implement an RELU neural network operation.

The PRELU neural network operation instruction may be configured to implement a PRELU neural network operation.

The SIGMOID neural network operation instruction may be configured to implement a SIGMOID neural network operation.

The TANH neural network operation instruction may be configured to implement a TANH neural network operation.

The MAXOUT neural network operation instruction may be configured to implement a MAXOUT neural network operation.

Furthermore, the neural network dedicated instruction may include a Cambricon instruction set.

The Cambricon instruction set may include at least one kind of Cambricon instruction, and the length of the Cambricon instruction may be 64 bits, or may be changed according to actual needs. The Cambricon instruction may be composed of an operation code and an operand. The Cambricon instruction may include four types of instructions: a Cambricon control instruction, a Cambricon data transfer instruction, a Cambricon operation instruction, and a Cambricon logical instruction.

The Cambricon control instruction may be configured to control the execution process, and the Cambricon control instruction may include a jump instruction and a conditional branch instruction.

The Cambricon data transfer instruction may be configured to transfer data between different storage media, and the Cambricon data transfer instruction may include a loading instruction, a storage instruction, and a moving instruction; where the loading instruction may be configured to load data from a main memory to a cache; the storage instruction may be configured to store data from the cache to the main memory; and the moving instruction may be configured to move data from the cache to another cache or from the cache to a register or from the register to another register. The data transfer instruction may support three different ways of organizing data including matrix, vector, and scalar.

The Cambricon operation instruction may be configured to perform a neural network arithmetic operation, and the Cambricon operation instruction may include a Cambricon matrix operation instruction, a Cambricon vector operation instruction, and a Cambricon scalar operation instruction.

The Cambricon matrix operation instruction may be configured to complete a matrix operation in the neural network, and the Cambricon matrix operation may include a matrix-vector multiplication operation, a vector multiply matrix operation, a matrix multiply scalar operation, an outer product operation, a matrix-add-matrix operation, and a matrix-subtract-matrix operation.

The Cambricon vector operation instruction may be configured to complete a vector operation in the neural network, and the Cambricon vector operation may include a vector elementary operation, a vector transcendental function operation, a dot product operation, a random vector generation operation, and an operation of maximum/minimum of a vector. The vector elementary operation may include addition, subtraction, multiplication, and division; the vector transcendental function may refer to a function which does not meet any polynomial equation taking polynomials as coefficients, which may include but not be limited to an exponential function, a logarithmic function, a trigonometric function, and an anti-trigonometric function.

The Cambricon scalar operation instruction may be configured to complete a scalar operation in the neural network, and the Cambricon scalar operation may include a scalar elementary operation and a scalar transcendental function. The scalar elementary operation may include addition, subtraction, multiplication, and division; the scalar transcendental function may refer to a function which does not meet any polynomial equation taking polynomials as coefficients, which may include but not be limited to an exponential function, a logarithmic function, a trigonometric function, and an anti-trigonometric function.

The Cambricon logical instruction may be configured for the logical operation of the neural network, and the Cambricon logical instruction may include a Cambricon vector logical operation instruction and a Cambricon scalar logical operation instruction.

The Cambricon vector logical operation instruction may include vector comparing, and vector logical operation. The vector comparing may include but not be limited to greater than, smaller than, equal to, greater than or equal to ($\geq$), less than or equal to ($\leq$), and unequal to. The vector logical operation may include AND, OR, and NOT.

The Cambricon scalar logical operation instruction may include a scalar comparing operation instruction and a scalar logical operation instruction. The scalar comparing operation may include but not be limited to greater than, smaller than, equal to, greater than or equal to ($\geq$), less than or equal to ($\leq$), and unequal to. The scalar logical operation may include AND, OR, and NOT.

A lookup table unit 2 may be configured to receive the search and control information, a weight dictionary and a weight codebook, and perform a table lookup operation on the weight dictionary and the weight codebook to obtain a quantized weight according to the search and control information An operation unit 3 may be configured to receive the operation control information and input neuron, and perform an operation on the quantized weight and input neuron according to the operation control information to obtain an output neuron and output the output neuron.

The operation unit 3 may include four operation parts:

a first operation part configured to multiply the quantized weight and the input neuron;

a second part configured to add the quantized weight and the input neuron through one or a plurality of adders (further, the plurality of adders may constitute an adder tree to implement the operation function of the different levels of the adder tree);

a third part configured to perform a nonlinear function operation on the quantized weight and the input neuron;

a fourth part configured to perform a pooling operation on the quantized weight and the input neuron.

By adopting a dedicated SIMD instruction and a customized operation unit 3 for a multi-layer artificial neural network operation aiming at local quantization, the problem that the CPU (Central Processing Unit) and GPU (General Processing Unit) have inadequate operational performance and the front-end decoding overhead is high may be solved, and the support for a multi-layer artificial neural network operation algorithm may be effectively improved.

Figure 5:
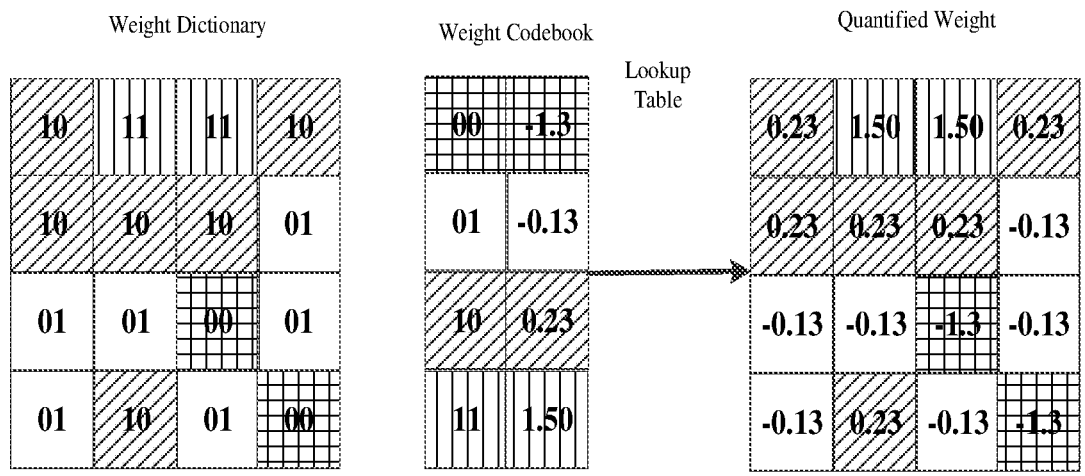
FIG. 5 is a flowchart of a table lookup operation according to an embodiment of the disclosure.

FIG. 5 is a flowchart of a table lookup operation according to an embodiment of the disclosure. As shown in FIG. 5, the quantized weights are grouped into four classes according to the weight codebook, where the class with a center weight of −1.30 is encoded as 00, the class with a center weight of −0.13 is encoded as 01, the class with a center weight of 0.23 is encoded as 10, and the class with a weight of 1.50 is encoded as 11. At the same time, referring to the weight dictionary, the distribution of the weights in the same class may be obtained, and the quantized weights may be obtained by replacing the corresponding codes in the weight dictionary with the center weights of each class.

The above operation fully exploits the similarity of the inter-layer-based weights and the local similarity of the intra-layer-based weights of the neural network, and table lookup operation is performed by using the weight dictionary and the weight codebook obtained during quantization to restore the quantized weight, which has good operability and standardization.

In order to optimize the processing device of the present disclosure, a storage unit 4, a pre-processing unit 5, and a caching unit 7 are added to make the processing data more orderly and facilitate the processing operations of the processing device.

Figure 6:
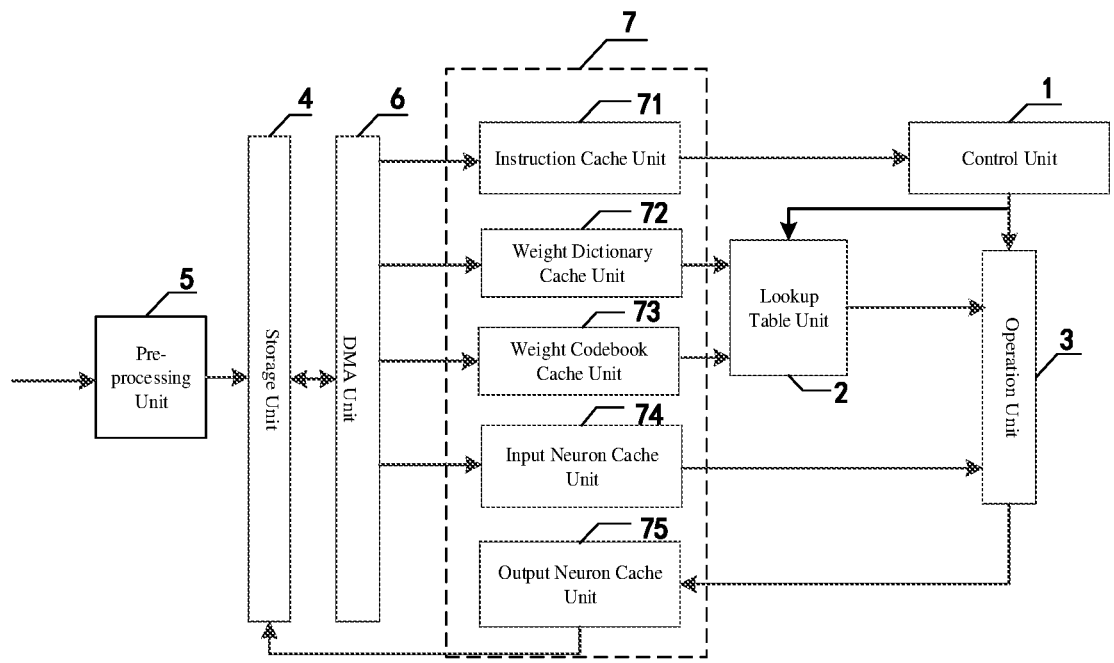
FIG. 6 is a schematic structure diagram of a specific embodiment of a processing device according to an embodiment of the disclosure.

FIG. 6 is a schematic structure diagram of a specific embodiment of a processing device according to an embodiment of the disclosure. As shown in FIG. 6, the processing device may further include a storage unit 4, a pre-processing unit 5, a DMA unit 6, and a caching unit 7 on the basis of the original structure shown in FIG. 4

The storage unit 4 may be configured to store an external input neuron, a weight dictionary, a weight codebook, and an instruction, and an output neuron output by the operation unit 3.

The storage unit 4 may further store an unquantized weight, which is directly output to the operation unit 3 through a bypass. It can be seen that the processing device of the present disclosure can process not only the quantized weight but also the unquantized weight according to different actual needs.

The pre-processing unit 5 may be configured to pre-process the external input information to obtain the input neuron, the weight dictionary, the weight codebook, and the instruction. The pre-processing may include segmentation, Gaussian filter, binarization, regularization, and/or normalization.

The caching unit 7 may include:

an instruction caching unit 71 configured to cache the instruction;

a weight dictionary caching unit 72 configured to cache the weight dictionary;

a weight codebook caching unit 73 configured to cache the weight codebook;

an input neuron caching unit 74 configured to cache the input neuron;

an output neuron caching unit 75 configured to cache the output neuron.

After the external input data is pre-processed by the pre-processing unit 5, the input neuron, the weight dictionary, the codebook, and the instruction are obtained and output to the storage unit 4. The DMA unit 6 may directly read the input neuron, the weight dictionary, the weight codebook, and the instruction from the storage unit 4, output the instruction to the instruction caching unit 71, output the weight dictionary to the weight dictionary caching unit 72, output the weight codebook to the weight codebook caching unit 73, and output the input neuron to the input neuron caching unit 74 for caching.

The control unit 1 may decode the received instructions to obtain and output a table lookup control information and an operation control information. The lookup table unit 2 may perform a table lookup operation on the weight dictionary and the weight codebook based on the received table lookup control information, obtain the quantized weight, and output the quantized weight to the operation unit 3. The operation unit 3 may select the operation part and the order of each operation part according to the received operation control information, and perform an operation on the quantized weight and the input neuron to obtain an output neuron and output it to the output neuron caching unit 75. Finally, the output neuron caching unit 75 may output the output neuron to the storage unit 4.

The operation of the first operation part is: multiplying first input data (in1) and second input data (in2) to get first output data (out1), where the process is: out=in1*in2.

The second operation part may be composed of one or a plurality of adders to achieve an addition operation. Further, the plurality of adders may constitute an adder tree to implement the operation function of the different levels of the adder tree. The second part may add first input data in1 step by step through the adder tree to obtain output data (out1), where in1 is a vector of length N, N is greater than 1, the process is: out1=in1[1]+in1[2]+ . . . +in1[N]; or add the first input data in1 step by step through the adder tree to obtain output data (out1), where in1 is a vector of length N, N is greater than 1, and then add the out1 and an second input data in2 to obtain output data out2, the process is: out2=in1[1]+in1[2]+ . . . +in1[N]+in2; or add the input data in1 and the input data in2 to obtain output data out3, where both in1 and in2 are numerical values, the process is out3=in1+in2.

The third operation part may perform a non-linear function (f) on the input data (in) to obtain different function operations, thereby obtaining the output data (out), and the process is: out=f(in). The non-linear function may include an active function, and the process is out=active(in). The active function may include but not be limited to sigmoid, tanh, relu, and/or softmax.

The fourth operation part may perform the pooling operation on the input data (in) to obtain the output data (out), and the process is out=pool(in), where pool represents the pooling operation. The pooling operation may include but not be limited to: mean pooling, maximum pooling, or median pooling. The input data in is the data in a pooling core associated with the output data(out).

One or more operation parts may be freely selected in different orders to achieve the operations with various functions. The operation unit 3 of the present disclosure may include but not be limited to the four operation parts, and may further include logical operations such as XOR, XNOR, OR and so on. The operation control information may control one or more operation parts in different combination orders to achieve the operations with various functions.

Figure 7:
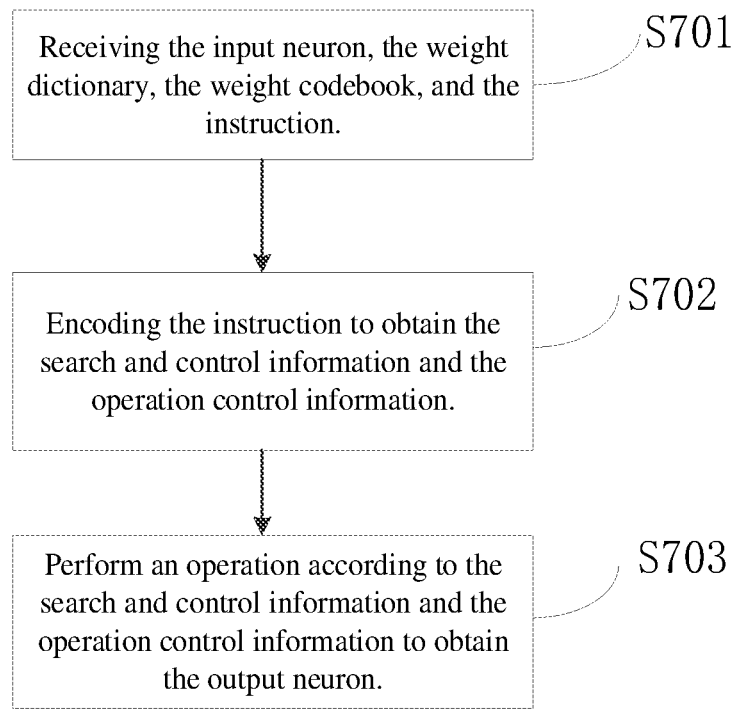
FIG. 7 is a flowchart of a processing method according to an embodiment of the disclosure.

Another embodiment of the present disclosure provides a processing method. FIG. 7 is a flowchart of a processing method according to an embodiment of the disclosure. As shown in FIG. 7, the processing method may include the following steps.

In step S701, receiving the input neuron, the weight dictionary, the weight codebook, and the instruction; where the input neuron, the weight dictionary, the weight codebook, and the instruction may be the obtained information after pre-processing the external information, and the pre-processing may include but not be limited to segmentation, Gaussian filter, binarization, regularization, normalization, and the like.

In step S702, encoding the instruction to obtain the lookup control information and operation control information; where the instruction may be a neural network dedicated instruction including all instructions dedicated to completing artificial neural network operations.

The dedicated instruction may include but not be limited to a control instruction, a data transfer instruction, an operation instruction and a logical instruction, where the control instruction may be configured to control the neural network execution process.

The data transfer instruction may be configured to transfer data between different storage media, and the data format may include but not be limited to matrix, vector and scalar.

The operation instruction may be configured to perform a neural network arithmetic operation, and the operation instruction may include but not be limited to a matrix operation instruction, a vector operation instruction, a scalar operation instruction, a convolutional neural network operation instruction, a fully connected neural network operation instruction, a pooling neural network operation instruction, an RBM neural network operation instruction, an LRN neural network operation instruction, an LCN neural network operation instruction, an LSTM neural network operation instruction, an RNN operation instruction, an ReLU neural network operation instruction, a PReLU neural network operation instruction, a SIGMOID neural network operation instruction, a TANH neural network operation instruction, and a MAXOUT neural network operation instruction.

The logical instruction may be configured to perform a logical operation of the neural network, and the logical instruction may include but not be limited to a vector logical operation instruction and a scalar logical operation instruction.

Where, the RBM neural network operation instruction may be configured to implement an RBM neural network operation.

The LRN neural network operation instruction may be configured to implement an LRN neural network operation.

The LCN neural network operation instruction may be configured to implement an LCN neural network operation.

The LSTM neural network operation instruction may be configured to implement an LSTM neural network operation.

The RNN neural network operation instruction may be configured to implement an RNN neural network operation.

The RELU neural network operation instruction may be configured to implement an RELU neural network operation.

The PRELU neural network operation instruction may be configured to implement a PRELU neural network operation.

The SIGMOID neural network operation instruction may be configured to implement a SIGMOID neural network operation.

The TANH neural network operation instruction may be configured to implement a TANH neural network operation.

The MAXOUT neural network operation instruction may be configured to implement a MAXOUT neural network operation.

Furthermore, the neural network dedicated instruction may include a Cambricon instruction set.

The Cambricon instruction set may include at least one kind of Cambricon instruction, and the length of the Cambricon instruction may be 64 bits. The Cambricon instruction may be composed of an operation code and an operand. The Cambricon instruction may include four types of instructions: a Cambricon control instruction, a Cambricon data transfer instruction, a Cambricon operation instruction, and a Cambricon logical instruction.

The Cambricon control instruction may be configured to control the execution process, and the Cambricon control instruction may include a jump instruction and a conditional branch instruction.

The Cambricon data transfer instruction may be configured to transfer data between different storage media, and the Cambricon data transfer instruction may include a loading instruction, a storage instruction, and a moving instruction; where the loading instruction may be configured to load data from a main memory to a cache; the storage instruction may be configured to store data from the cache to the main memory; and the moving instruction may be configured to move data from the cache to another cache or from the cache to a register or from the register to another register. The data transfer instruction may support three different ways of organizing data including matrix, vector, and scalar.

The Cambricon operation instruction may be configured to perform a neural network arithmetic operation and the Cambricon operation instruction may include a Cambricon matrix operation instruction, a Cambricon vector operation instruction, and a Cambricon scalar operation instruction; where the Cambricon matrix operation instruction may be configured to complete a matrix operation in the neural network, and the Cambricon matrix operation may include a matrix-vector multiplication operation, a vector multiply matrix operation, a matrix multiply scalar operation, an outer product operation, a matrix-add-matrix operation, and a matrix-subtract-matrix operation; the Cambricon vector operation instruction may be configured to complete a vector operation in the neural network, and the Cambricon vector operation may include a vector elementary operation, a vector transcendental function operation, a dot product operation, a random vector generation operation, and an operation of maximum/minimum of a vector. The vector elementary operation may include addition, subtraction, multiplication, and division; the vector transcendental function may refer to a function which does not meet any polynomial equation taking polynomials as coefficients, and the function may include an exponential function, a logarithmic function, a trigonometric function, and an anti-trigonometric function.

The Cambricon scalar operation instruction may be configured to complete a scalar operation in the neural network, and the Cambricon scalar operation may include a scalar elementary operation and a scalar transcendental function operation. The vector elementary operation may include addition, subtraction, multiplication, and division; the scalar transcendental function may refer to a function which does not meet any polynomial equation taking polynomials as coefficients, and the scalar transcendental function may include an exponential function, a logarithmic function, a trigonometric function, and an anti-trigonometric function.

The Cambricon logical instruction may be configured for the logical operation of the neural network, and the Cambricon logical instruction may include a Cambricon vector logical operation instruction and a Cambricon scalar logical operation instruction. The Cambricon vector logical operation instruction may include vector comparing and vector logical operation. The vector comparing may include but not be limited to greater than, smaller than, equal to, greater than or equal to ($\geq$), less than or equal to ($\leq$), and unequal to. The vector logical operation may include AND, OR, and NOT. The Cambricon scalar logical operation instruction may include a scalar comparing operation instruction and a scalar logical operation instruction. The scalar comparing operation may include but not be limited to greater than, smaller than, equal to, greater than or equal to ($\geq$), less than or equal to ($\leq$), and unequal to. The scalar logical operation may include AND, OR, and NOT.

In step S703, looking up, according to the lookup control information, the weight dictionary and the weight codebook to obtain the quantized weight; performing operation on the quantized weight and the input neuron according to the operation control information to obtain and output the output neuron.

Moreover, in order to optimize the processing method of the present disclosure to make the processing more conveniently and orderly, steps are added in some embodiments of the present disclosure.

Figure 8:
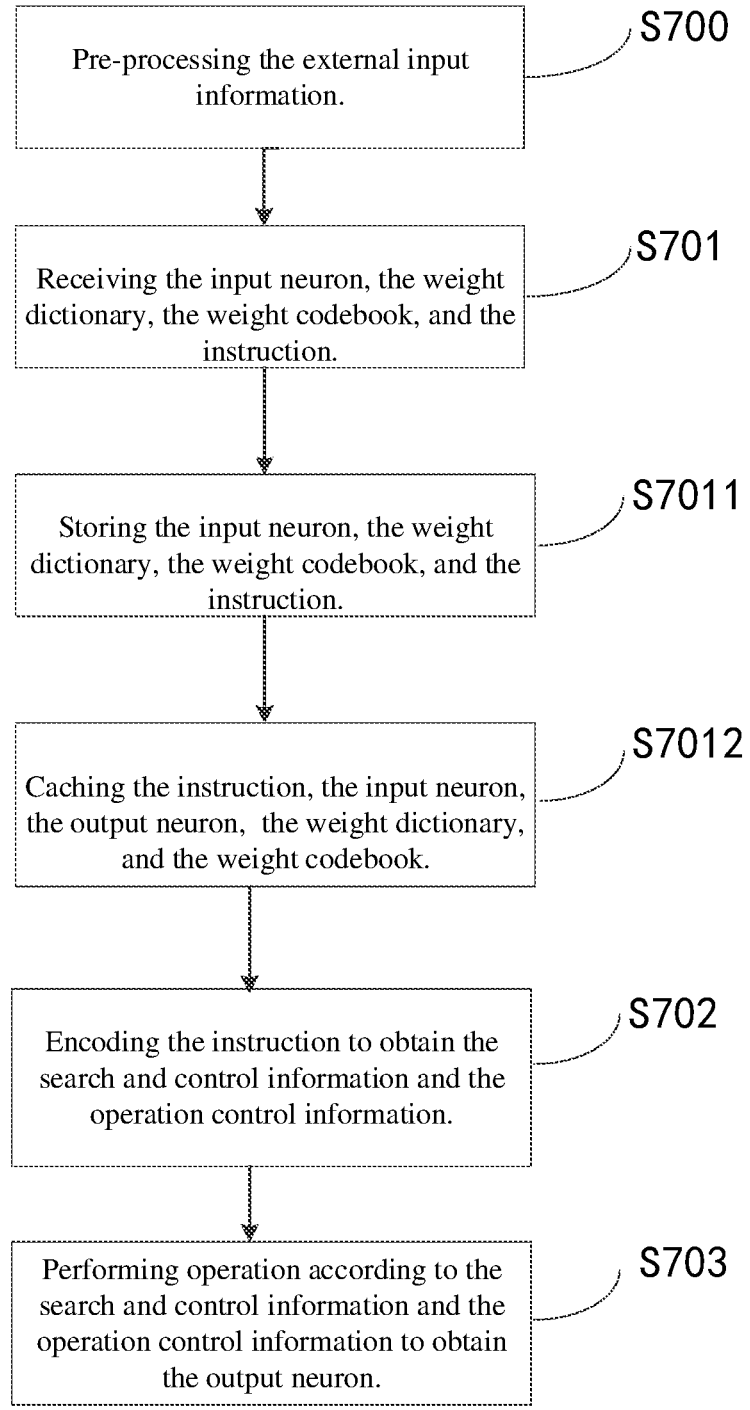
FIG. 8 is a flowchart of a specific embodiment of a processing method according to an embodiment of the disclosure.

FIG. 8 is a flowchart of a specific embodiment of a processing method according to an embodiment of the disclosure. As shown in FIG. 8, before the step S701, the processing method may further include step S700: pre-processing the external input information to obtain the input neuron, the weight dictionary, the weight codebook, and the instruction. Furthermore, the pre-processing may include data segmentation, Gaussian filter, binarization, regularization, normalization, and the like.

The operation may include: adding a weight to an input neuron, where the addition function may be implemented by one or a plurality of adders, and further, the plurality of adders may also constitute an adder tree to add the weight and input neuron step by step, and/or; multiplying the weight and the input neuron, and/or;

performing the non-linear function on the weight and the input neuron, where the non-linear function may include an active function, and active function may include sigmoid, tanh, relu, and/or softmax, and/or;

performing a pooling operation on the weight and the input neuron, where the weight may include the quantized weight and/or unquantized weight, and the pooling operation may include but not be limited to: mean pooling, maximum pooling, or median pooling, the input data in is the data in a pooling core associated with the output data (out).

One or more operation parts may be freely selected in different orders to achieve the operations with various functions. The operation steps of the present disclosure may include but not be limited to the four operations, and may further include logical operations such as XOR, XNOR, OR and so on.

Furthermore, the processing method may be adopted to process the unquantized weight. The unquantized weight and the input neuron may be operated according to the operation control information to obtain and output the output neuron.

In an embodiment, the present disclosure may further provide a chip including the processing device, which is capable of performing a plurality of operations on quantized weight and unquantized weight simultaneously, thereby realizing diversification of operations.

In addition, by adopting a dedicated on-chip cache for the multi-layer artificial neural network operation algorithm, the present disclosure fully exploits the reuse of input neurons and weight data, which avoids repeatedly reading these data into memory, reducing memory access bandwidth, therefore, memory bandwidth is no longer a bottleneck of the performance of multi-layer artificial neural network operations and training algorithms.

In some embodiments, the present disclosure provides a chip package structure, which may include the chip.

In some embodiments, the present disclosure provides a board card, which may include the chip package structure.

In some embodiments, the present disclosure provides an electronic device, which may include the board card.

The electronic device may include a data processing device, a robot, a computer, a printer, a scanner, a tablet computer, an intelligent terminal, a mobile phone, an automobile data recorder, a navigator, a sensor, a webcam, a cloud server, a camera, a video camera, a projector, a watch, an earphone, a mobile storage, wearable equipment, a vehicle, a household electrical appliance and/or medical equipment.

The vehicles may include an airplane, a ship and/or a car. The household electrical appliance includes a television, an air conditioner, a microwave oven, a refrigerator, an electric rice cooker, a humidifier, a washing machine, an electric lamp, a gas cooker and a range hood. The medical equipment includes a nuclear magnetic resonance spectrometer, a B-ultrasonic scanner and/or an electrocardiograph.

All units and modules of the present disclosure may be hardware circuits. Physical implementations of the hardware circuits may include but not be limited to physical devices, and the physical devices may include but not be limited to transistors, memristors, DNA computer, and the like.

Those skilled in the art should understand that the modules in the devices of the embodiment may be adaptively changed and placed in one or more different devices of the embodiment. The modules or units or components of the embodiment may be combined into one module or unit or component, and may be divided into a plurality of sub-modules or sub-units or sub-components. In addition to the above characteristics and/or process or that at least some of units are mutually exclusive, all of the characteristics, processes or units of any method or device disclosed in this specification (including accompanying claims, abstracts and drawings) may be combined in any manner. Unless there are clear statements, each feature disclosed in this specification (including accompanying claims, abstracts and drawings) can be replaced by an alternative feature of the same, equivalent or similar purpose.

The purposes, technical solutions, and beneficial effects of the present disclosure are further described above with the specific embodiments in detail. It is to be understood that the above is only the specific embodiment of the disclosure and not intended to limit the disclosure. Any modifications, equivalent replacements, improvements, and the like made within the spirit and principle of the disclosure shall fall within the scope of protection of the disclosure.

What is claimed is:

1. A data quantization method, comprising:
   grouping weights of a neural network;
   performing a clustering operation on each group of weights by using a clustering algorithm, dividing a group of weights into m classes, computing a center weight for each class, and replacing all the weights in each class by the center weights, where m is a positive integer;
   encoding the center weight to get a weight codebook and a weight dictionary,
   wherein the grouping includes grouping into a group, an inter-layer-based grouping, and an intra-layer-based grouping, and the method further includes grouping convolutional layers into one group, grouping fully connected layers by the intra-layer-based grouping, and grouping LSTM layers by the inter-layer-based grouping.

2. The data quantization method of claim 1, further comprising:
   retraining the neural network, where only the weight codebook is trained, and the weight dictionary remains unchanged.

3. The data quantization method of claim 2, wherein the retraining adopts a back-propagation algorithm.

4. The data quantization method of claim 1, wherein the clustering algorithm includes K-means, K-medoids, Clara, and/or Clarans.

5. The data quantization method of claim 1, wherein the grouping is grouping all weights of the neural network into one group.

6. The data quantization method of claim 1, wherein the grouping is the layer-type-based grouping, the neural network has a total of different types of t layers including i convolutional layers, j fully connected layers, and m LSTM layers, where i, j, m are integers greater than or equal to 0, and satisfy $i+j+m \geq 1$, t is an integer greater than or equal to 1 and satisfies $t=i+j+m$, and the layer-type-based grouping includes:
   grouping the weights of the neural network into t groups.

7. The data quantization method of claim 1, wherein the grouping is the inter-layer-based grouping, and the method includes:
   grouping the weights of one or more convolutional layers into a first weight group, the weights of one or more fully connected layers into a second weight group, and the weights of one or more LSTM layers in the neural network into a third weight group.

8. The data quantization method of claim 1, wherein the grouping is the intra-layer-based grouping, and the method includes:
   determining the convolutional layer of the neural network as a four-dimensional matrix (Nfin, Nfout, Kx, Ky), where Nfin, Nfout, Kx, Ky are positive integers, Nfin represents a count of input feature maps, Nfout represents a count of output feature maps, and (Kx, Ky) represents a size of a convolution kernel; grouping the weights of the convolutional layer into Nfin*Nfout*Kx*Ky/(Bfin*Bfout*Bx*By) different groups according to a group size of (Bfin, Bfout, Bx, By), where Bfin is a positive integer less than or equal to Nfin, Bfout is a positive integer less than or equal to Nfout, Bx is a positive integer less than or equal to Kx, and By is a positive integer less than or equal to Ky;
   determining the fully connected layer of the neural network as a two-dimensional matrix (Nin, Nout), where Nin and Nout are positive integers, Nin represents a count of input neurons, Nout represents a count of output neurons, and a count of weight is Nin*Nout; the weights of fully connected layer are divided into (Nin*Nout)/(Bin*Bout) different groups according to a group size of (Bin, Bout), where Bin is a positive integer less than or equal to Nin, and Bout is a positive integer less than or equal to Nout; and
   determining the weights of the LSTM layer of the neural network as a combination of the weights of a plurality of fully connected layers, where the weights of the LSTM layer are composed of the weights of n fully connected layers, and n is a positive integer, in this way, each fully connected layer can be grouped according to a grouping mode of the fully connected layer.

9. The data quantization method of claim 1, wherein a center weight selection method of a class is: minimizing a cost function $J(w, w_0)$.

10. The data quantization method of claim 9, wherein the cost function is:

$$J(w, w_0) = \sum_{i=1}^{n} (w_i - w_0)^2$$

where w is a weight of a class, w0 is a center weight of the class, n is a count of weights in the class, n is a positive integer, w1 is an $i^{th}$ weight of the class, i is a positive integer, and $1 \leq i \leq n$.

11. A data quantization device, comprising:
a memory configured to store an operation instruction; and
a processor configured to:
group weights of a neural network;
perform a clustering operation on each group of weights by using a clustering algorithm, dividing a group of weights into m classes, computing a center weight for each class, and replacing all the weights in each class by the center weights, where m is a positive integer;
encode the center weight to get a weight codebook and a weight dictionary;
group weights in accordance at least one of layer-type-based grouping, inter-layer-based grouping, or intra-layer-based grouping, wherein the processor is further configured to:
group convolutional layers into one group,
group fully connected layers by the intra-layer-based grouping, and
group LSTM layers by the inter-layer-based grouping.

12. The data quantization device of claim 11, wherein the operation instruction is a binary number including an operation code and an address code, where the operation code indicates an operation to be performed by the processor, and the address code indicates an address in the memory where the processor reads data participating in the operation.

13. The data quantization device of claim 11, wherein the processor is further configured to retrain the neural network, where only the weight codebook is trained, and the weight dictionary remains unchanged.

14. The data quantization device of claim 11, wherein the processor is further configured to group all weights of the neural network into one group.

15. The data quantization device of claim 11, wherein the processor is further configured to group the weights of one or a plurality of convolutional layers, the weights of one or a plurality of fully connected layers, and the weights of one or a plurality of LSTM layers in the neural network into one group respectively.

16. The data quantization device of claim 11, wherein the processor is further configured to:
determine the convolutional layer of the neural network as a four-dimensional matrix (Nfin, Nfout, Kx, Ky), where Nfin, Nfout, Kx, Ky are positive integers, Nfin represents a count of input feature maps, Nfout represents a count of output feature maps, and (Kx, Ky) represents a size of a convolution kernel; grouping the weights of the convolutional layer into Nfin*Nfout*Kx*Ky/(Bfin*Bfout*Bx*By) different groups according to a group size of (Bfin, Bfout, Bx, By), where Bfin is a positive integer less than or equal to Nfin, Bfout is a positive integer less than or equal to Nfout, Bx is a positive integer less than or equal to Kx, and By is a positive integer less than or equal to Ky;
determine the fully connected layer of the neural network as a two-dimensional matrix (Nin, Nout), where Nin and Nout are positive integers, Nin represents a count of input neurons, Nout represents a count of output neurons, and a count of weight is Nin*Nout; the weights of fully connected layer are divided into (Nin*Nout)/(Bin*Bout) different groups according to a group size of (Bin, Bout), where Bin is a positive integer less than or equal to Nin, and Bout is a positive integer less than or equal to Nout; and
determine the weights of the LSTM layer of the neural network as a combination of the weights of a plurality of fully connected layers, where the weights of the LSTM layer are composed of the weights of n fully connected layers, and n is a positive integer, in this way, each fully connected layer can be grouped according to a grouping mode of the fully connected layer.

* * * * *